(12) United States Patent
Kuroda et al.

(10) Patent No.: US 11,511,626 B2
(45) Date of Patent: Nov. 29, 2022

(54) INFORMATION DISPLAY DEVICE FOR VEHICLE

(71) Applicant: HONDA MOTOR CO., LTD., Tokyo (JP)

(72) Inventors: Kazufumi Kuroda, Wako (JP); Hiroyuki Kurokawa, Wako (JP); Kotaro Higuchi, Wako (JP); Masaru Aoki, Wako (JP); Eiichi Hoshino, Wako (JP); Keisuke Kato, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 243 days.

(21) Appl. No.: 16/585,345

(22) Filed: Sep. 27, 2019

(65) Prior Publication Data
US 2020/0105073 A1 Apr. 2, 2020

(30) Foreign Application Priority Data
Sep. 28, 2018 (JP) .............................. JP2018-185508

(51) Int. Cl.
*B60K 35/00* (2006.01)
*G07C 5/12* (2006.01)
(Continued)

(52) U.S. Cl.
CPC ............ *B60K 35/00* (2013.01); *B60K 6/28* (2013.01); *B60L 53/60* (2019.02); *B60L 55/00* (2019.02);
(Continued)

(58) Field of Classification Search
CPC ........ B60K 20/02; B60K 20/08; B60K 35/00; B60K 37/02; B60K 37/04; B60K 37/06;
(Continued)

(56) References Cited

U.S. PATENT DOCUMENTS

| | | | | |
|---|---|---|---|---|
| 5,764,139 A | * | 6/1998 | Nojima .................. | B60K 35/00 340/438 |
| 6,621,471 B1 | * | 9/2003 | Ozaki .................... | B60K 35/00 345/4 |

(Continued)

FOREIGN PATENT DOCUMENTS

| | | | | |
|---|---|---|---|---|
| CN | 103492215 A | | 1/2014 | |
| CN | 104827977 A | * | 8/2015 | ............... G06F 8/60 |

(Continued)

OTHER PUBLICATIONS

2018 Kia Niro Hybrid/Plug-in Hybrid Owner's Manual, (c) 2017 Kia Motors Corp., 646 pages (Year: 2018).*

(Continued)

*Primary Examiner* — David A Testardi
(74) *Attorney, Agent, or Firm* — WHDA, LLP (57) ABSTRACT

Provided is an information display device for a vehicle having a display control section acquiring information of the vehicle and a display section displaying an image selected by the display control section. The vehicle includes a shift lever that can select at least a parking range and a driving range, and an in displayed on the display section includes either a first vehicle image or a second vehicle that are images of the vehicle viewed from mutually different directions. On the display section, the display control section displays the first vehicle image when the shift lever selects the parking range and the second vehicle image when the shift lever selects at least the driving range.

8 Claims, 6 Drawing Sheets

(51) Int. Cl.
  *G07C 5/06*   (2006.01)
  *G06F 3/14*   (2006.01)
  *B60L 53/60*   (2019.01)
  *G07C 5/00*   (2006.01)
  *B60L 58/12*   (2019.01)
  *B60K 6/28*   (2007.10)
  *B60L 55/00*   (2019.01)

(52) U.S. Cl.
  CPC .............. *B60L 58/12* (2019.02); *G06F 3/14*
  (2013.01); *G07C 5/004* (2013.01); *G07C 5/06*
  (2013.01); *G07C 5/12* (2013.01); *B60K*
  *2370/167* (2019.05); *B60Y 2200/92* (2013.01);
  *B60Y 2300/91* (2013.01); *B60Y 2400/11*
  (2013.01)

(58) Field of Classification Search
  CPC ............ B60K 2370/11; B60K 2370/31; B60K
  2370/52; B60K 2370/119; B60K
  2370/152; B60K 2370/154; B60K
  2370/171; B60K 2370/172; B60K
  2370/186; B60K 2370/1868; B60K
  2370/1876; B60K 2370/193; F16H 59/02;
  F16H 59/08; G07C 5/08; G07C 5/0816;
  G07C 5/0825; G07C 5/12; G07C 5/004;
  G07C 5/06; B60W 50/14; B60W
  2050/146; G01C 21/00; G01C 21/3697;
  B60L 55/00
  See application file for complete search history.

(56) References Cited

U.S. PATENT DOCUMENTS

| | | | | |
|---|---|---|---|---|
| 2007/0176797 | A1* | 8/2007 | Rhodes | G01C 21/26 |
| | | | | 340/995.15 |
| 2009/0171529 | A1* | 7/2009 | Hayatoma | B60K 35/00 |
| | | | | 701/36 |
| 2010/0161217 | A1* | 6/2010 | Yamamoto | B60L 53/36 |
| | | | | 701/408 |
| 2012/0091959 | A1* | 4/2012 | Martin | B60L 53/38 |
| | | | | 320/109 |
| 2012/0179319 | A1* | 7/2012 | Gilman | B60W 50/14 |
| | | | | 701/22 |
| 2014/0070606 | A1* | 3/2014 | Gibeau | B60L 53/63 |
| | | | | 307/9.1 |
| 2014/0088794 | A1* | 3/2014 | Yashiro | G08C 17/02 |
| | | | | 701/2 |
| 2014/0143702 | A1* | 5/2014 | Matsuoka | B60K 35/00 |
| | | | | 715/772 |
| 2014/0303820 | A1* | 10/2014 | Aoki | B60W 20/13 |
| | | | | 701/22 |
| 2015/0054466 | A1* | 2/2015 | Kinomura | B60L 53/63 |
| | | | | 320/134 |
| 2015/0061592 | A1* | 3/2015 | Nakasone | H02J 7/0027 |
| | | | | 320/109 |
| 2015/0115895 | A1* | 4/2015 | Kim | H02J 7/0029 |
| | | | | 320/136 |
| 2015/0177956 | A1* | 6/2015 | Han | G06F 3/048 |
| | | | | 715/771 |
| 2015/0375620 | A1* | 12/2015 | Tanaka | B60K 37/02 |
| | | | | 340/441 |
| 2016/0059720 | A1* | 3/2016 | Yamamoto | B60L 50/51 |
| | | | | 320/134 |
| 2016/0129802 | A1* | 5/2016 | Yoon | G06Q 30/0283 |
| | | | | 705/412 |
| 2016/0300378 | A1* | 10/2016 | Thomas | G06T 13/20 |
| 2016/0375769 | A1* | 12/2016 | Shiota | B60K 37/02 |
| | | | | 340/439 |
| 2017/0174081 | A1* | 6/2017 | Nojiri | B60K 37/02 |
| 2017/0315709 | A1* | 11/2017 | Yamauchi | G06F 3/0484 |
| 2018/0057014 | A1* | 3/2018 | Terayama | B60W 50/0098 |
| 2018/0118028 | A1* | 5/2018 | Ueo | B60K 35/00 |
| 2018/0118037 | A1* | 5/2018 | Ueo | B60W 50/04 |
| 2018/0154793 | A1* | 6/2018 | Jun | B60L 50/16 |
| 2018/0373343 | A1* | 12/2018 | Hashimoto | B60W 30/06 |
| 2019/0075268 | A1* | 3/2019 | Goto | B60R 1/00 |
| 2019/0087665 | A1* | 3/2019 | Yokota | H04N 7/18 |
| 2020/0101858 | A1* | 4/2020 | Kuroda | H02J 7/0047 |
| 2020/0391593 | A1* | 12/2020 | Lee | G08G 1/09626 |
| 2020/0398666 | A1* | 12/2020 | Higuchi | B60K 6/46 |

FOREIGN PATENT DOCUMENTS

| | | | | |
|---|---|---|---|---|
| DE | 102011116314 A1 | * | 4/2013 | ............ B60K 35/00 |
| JP | 9-98501 A | | 4/1997 | |
| JP | 2011091879 A | * | 5/2011 | |
| JP | 2011093491 A | * | 5/2011 | ............ B60L 1/006 |
| JP | 2014218139 A | * | 11/2014 | ............ B60K 35/00 |
| WO | WO-2005122129 A1 | * | 12/2005 | ............ G06F 8/60 |
| WO | 2017/154833 A1 | | 9/2017 | |

OTHER PUBLICATIONS

Office Action dated Aug. 3, 2022, isued in counterpart CN applicaiton No. 201910869314.8 with English translation. (19 pages).

* cited by examiner

INFORMATION DISPLAY DEVICE FOR VEHICLE

CROSS-REFERENCE TO RELATED APPLICATION

The present disclosure contains subject matter related to Japanese Patent Application No. 2018-185508 filed on Sep. 28, 2018, the entire contents of which are incorporated herein by reference.

BACKGROUND OF THE INVENTION

Field of the Invention

The present invention relates to an information display device for a vehicle that displays information of the vehicle and informs a user thereof, and specifically relates to the information display device for the vehicle that can display information about the vehicle equipped with a capacitor.

Description of Related Art

Conventionally, there is an information display device for a vehicle that shows a running state of the vehicle, driving states of an engine and a motor installed in the vehicle, a residual amount of a battery for driving the motor, etc. Such information display device for the vehicle is configured to show a status of the vehicle visually by using an icon or an image so that a user such as a driver can easily grasp a status of the vehicle (for instance, refer to Japanese Unexamined Patent Application No. H09-098501, i.e. Patent Document 1).

In Patent Document 1, a fixed appearance-image of a vehicle is displayed on an information display. And, inside and outside this vehicle image, motor- or battery-shaped indicating lamps and an indicating lamp indicating shift positions of a shift lever are arranged, thereby visually indicating a state of each part depending on a vehicle state by turning on and off each of the lamps.

SUMMARY OF THE INVENTION

However, only the arrangement of the indicating lamps to be turned on or off, in addition to the fixed vehicle image may narrow the range of expression, whereby a user might fail to accurately recognize a vehicle status.

The present invention was made in view of above-mentioned point, and the purpose is to provide the information display device for the vehicle so that the user can accurately recognize the vehicle status.

Means for Solving the Problem

In order to solve the above-described problems, an information display device for a vehicle in accordance with the present invention includes a display control section (51) that acquires information of a vehicle (1) and a display section (52) that displays an image selected by the display control section (51). The vehicle (1) is provided with a shift lever (60) that can select at least a parking range (P) and a driving range (D). Images displayed on the display section (52) include one of a first vehicle image (G1) and a second vehicle image (G2) that are images of the vehicle viewed from mutually different directions. On the display section (52), the display control section (51) characteristically displays the first vehicle image (G1) when the shift lever (60) selects the parking range (P) and the second vehicle image (G2) instead of the first vehicle image (G1) when the shift lever (60) selects at least the driving range (D).

In this manner, as the display section displays the vehicle images viewed from the mutually different directions according to whether the shift lever selects the parking range or a range other than the driving range, the user can immediately identify whether the vehicle is in the parking state according to the vehicle image on the display section. Thus, the user can accurately recognize the vehicle status.

Furthermore, in the above-described information display device for the vehicle, the first vehicle image (G1) may be an image of a vehicle viewed from the side, and the second vehicle image (G2) may be an image of a vehicle viewed from the above.

Thus, if the image of a vehicle viewed from the side is displayed as the first vehicle image when the shift lever selects the parking range, and the image of a vehicle viewed from the above is displayed as the second vehicle image when the shift lever selects a range other than the parking range, the first and second vehicle images look different significantly from each other, which enables the user to immediately identify whether the vehicle is in the parking state. Furthermore, when the first vehicle image as the image of the vehicle viewed from the side of the vehicle is displayed, a still object can be displayed in the travelling direction of the vehicle, and a rotatable wheel put in stand-still can be displayed so as to expand the range of expression of the vehicle state. On the other hand, the second vehicle image as the image of the vehicle viewed from the above of the vehicle can effectively represent the vehicle being travelling.

Moreover, in the above-described information display device for the vehicle, the first vehicle image (G1) may be displayed so that the horizontal direction of the display section (52) corresponds to the front-back direction of the vehicle, and the second vehicle image (G2) may be displayed so that the vertical direction of the display section (52) corresponds to the front-back direction of the vehicle.

In this manner, if the first vehicle image when the shift lever selects the parking range is displayed so that the horizontal direction of the display section corresponds to the front-back direction of the vehicle, and the second vehicle image when the shift lever selects a range other than the parking range is displayed so that the vertical direction of the display section corresponds to the front-back direction of the vehicle, the first and second vehicle images look significantly different from each other, which enables the user to immediately identify whether the vehicle is in the parking state according to how the vehicle image looks on the display section. Further, if the first vehicle image is displayed so that the front-back direction thereof corresponds to the horizontal direction of the display section, the real travelling direction of the vehicle is different from the front-back direction of the first vehicle image. This, the user can intuitively grasp that the vehicle is in the parking state by viewing the first vehicle image. On the other hand, if the second vehicle image is displayed so that the front-back direction thereof corresponds to the vertical direction of the display section, the real travelling direction of the vehicle corresponds to the front-back direction on the display section. Thus, the user can intuitively grasp that the vehicle is travelling or ready to start travelling by viewing the second vehicle image.

Furthermore, in the above-described information display device for the vehicle, the vehicle (1) has driving wheels (WR, WL), an electric motor (3) serving as a power source of the driving wheels (WR, WL) and performs regeneration from the driving wheels (WR, WL), and a capacitor (13) that transmits and receives electric power to and from the electric motor (3). The capacitor (13) can transmit and receive electric power to and from an electric power system (15) outside the vehicle (1). When displaying the first vehicle image (G1) on the display section (52), the display control section (51) may display first information (I1) related to transmission and reception of electric power between the capacitor (13) and the electric power system (15) around or inside the first vehicle image (G1). And, when displaying the second vehicle image (G2) on the display section (52), the display control section (51) may display second information (I2) related to transmission and reception of electric power between the capacitor (13) and the electric motor (3) around or inside the second vehicle image (G2).

In this manner, when displaying the first vehicle image displayed when the shift lever selects the parking range, the displaying of the first information related to transmission and reception of electric power between the capacitor and the external electric power system around or inside the first vehicle image can convey specific information in the parking state of the vehicle such as information of charging of and feeding from the capacitor to the user. On the other hand, when displaying the second vehicle image displayed when the shift lever selects a range other than the parking range, the displaying of the second information related to transmission and reception of electric power between the capacitor and the electric motor around or inside the second vehicle image can convey specific information at the time of vehicle travelling such as information of drive and non-drive of the electric motor by using the capacitor to the user. Thus, the user can accurately recognize the vehicle status by being shown information according to a vehicle state, as well as whether the vehicle is in the parking state.

Moreover, in the above-described information display device for the vehicle, the first information (I1) may include at least one of information (I1a) of time required for completing charging when the capacitor (13) is charging from the electric power system (15), information (I1b) indicating whether the capacitor (13) is charging from the electric power system (15) or the capacitor (13) is feeding the electric power system (15), information (I1c) indicating a residual amount of the capacitor (13), and information (I1d) indicating a travelable distance of the vehicle (1) based on the residual amount of the capacitor (13).

In this manner, the first information is displayed together with the first vehicle image when the shift lever selects the parking range. Here, as the first information includes at least one of the information of time required for completing charging, the information indicating the charging state or the feeding state, the information indicating the residual amount of the capacitor, and the information indicating the travelable distance based on the residual amount of the capacitor, the user can recognize the vehicle status in the parking state in more detail.

Moreover, in the above-described information display device for the vehicle, the second information (I2) may include at least one of information (I2a) of a travelable distance using the electric motor (3), information (I2b) of a power consumption rate of the electric motor (3), and information (I2c) indicating either the state that the electric motor (3) is regenerating or the state that the electric motor (3) is driving.

Thus, as the second information displayed together with the second vehicle image when the shift lever selects a range other than the parking range includes at least one of the information of the travelable distance using the electric motor, the information of the power consumption rate of the electric motor, and the information indicating either the state that the electric motor is regenerating or the state that the electric motor is driving, the user can recognize the vehicle status in more detail.

Furthermore, in the above-described information display device for the vehicle, when, displaying the first vehicle image (G1) on the display section (52), the display control section (51) may display an image (G10) indicating an electric power transmission state in charging of or feeding from the capacitor (13) inside the first vehicle image (G1).

In this manner, when displaying the first vehicle image displayed when the shift lever selects the parking range, the image indicating the electric power transmission state in charging of or feeding from the capacitor is displayed inside the first vehicle image. As the charging of or feeding from the capacitor is performed in the parking state of the vehicle, the user can be visually shown that the vehicle is in the parking state. The user can also recognize the vehicle status in the parking state while recognizing that the vehicle is in the parking state.

Further, in the above-described information display device for the vehicle, the vehicle (1) has an internal combustion engine (2) serving as a power source of the driving wheels (WR, WL). When displaying the second vehicle image (G2) on the display section (52), the display control section (51) may display inside the second vehicle image (G2), an image (G20) indicating a driving power transmission state or an electric power transmission state from the internal combustion engine (2) and the electric motor (3) to the driving wheels (WR, WL).

In this manner, when displaying the second vehicle image when the shift lever selects a range other than the parking range, the image indicating the driving power transmission state or the electric power transmission state from the internal combustion engine and the electric motor to the driving wheels is displayed in the second vehicle image. As the driving power transmission or the electric power transmission from the internal combustion engine and the electric motor to the driving wheels is performed under a travelable condition of the vehicle, the user can visually see that the vehicle is in the travelable state. Also, the user can easily recognize the vehicle status in the travelable state while recognizing that the vehicle is in the travelable state.

Moreover, in the above-described information display device for the vehicle, an information (I2e) related to a fuel consumption rate of the internal combustion engine (2) may be displayed around or inside the second vehicle image (G2) when displaying the second vehicle image (G2) on the display section (52).

Thus, the displaying of the information related to the fuel consumption rate of the internal combustion engine when the shift lever selects a range other than the parking range allows the use to recognize the vehicle status in the travelable state in detail.

It should be noted that the bracketed reference numerals are examples of the elements of the embodiment described later.

Effect of the Invention

According to the information display device for the vehicle in accordance with the present invention, the user can accurately recognize the vehicle status.

BRIEF DESCRIPTION OF THE INVENTION

DESCRIPTION OF THE EMBODIMENTS

Figure 1:
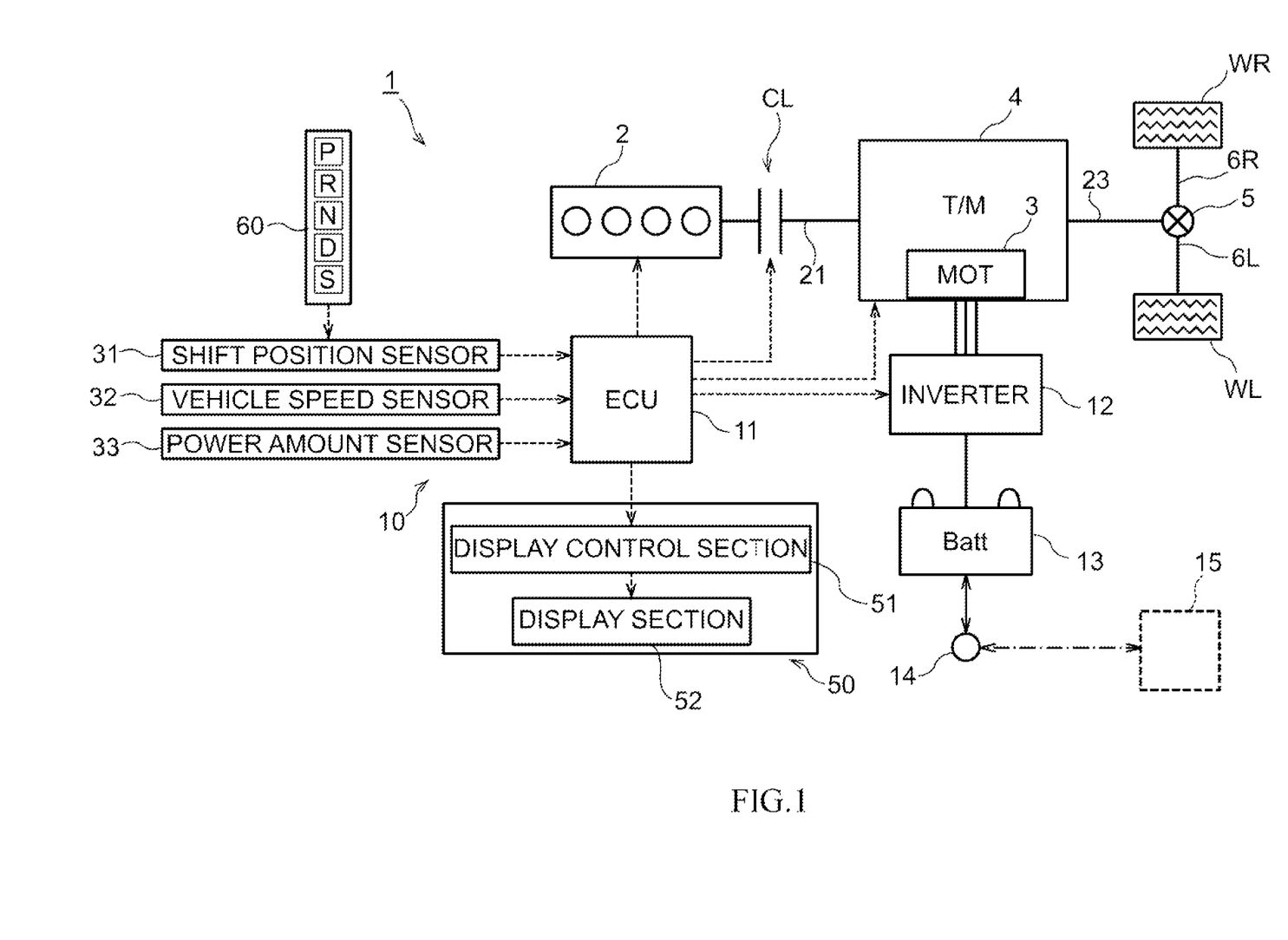
FIG. 1 is a schematic diagram illustrating an exemplary configuration of a vehicle provided with an information display device for a vehicle of this embodiment.

Hereinafter, an embodiment of the present invention will be described in detail with reference to the accompanying drawings. FIG. 1 is a schematic diagram illustrating an exemplary configuration of a vehicle provided with a vehicle information display device 50 for a vehicle of this embodiment. A vehicle 1 shown in FIG. 1 is a hybrid automobile vehicle provided with an engine (namely, internal combustion engine) 2 and a motor (namely, electric motor) 3 as driving sources.

Furthermore, the vehicle 1 includes an inverter 12 for controlling the motor 3, a battery (namely, capacitor) 13, a transmission 4, a differential mechanism 5, right and left drive shafts 6R, 6L and right and left driving wheels WR, WL. Here, the motor 3 includes a motor generator, and the battery 13 includes a capacitor. In addition, an input shaft 21 is arranged between the engine 2 and the transmission 4. A clutch CL for adjusting power transmission in the input shaft 21 is arranged to the input shaft 21. In addition, an output shaft 23 is arranged between the transmission 4 and the differential mechanism 5. According to this configuration, rotation driving force of the engine 2 and the motor 3 is transmitted to the right and left drive wheels WR, WL via the input shaft 21, the transmission 4, the differential mechanism 5 and the drive shafts 6R, 6L.

Moreover, the vehicle 1 can transmit and receive electric power of the battery 13 to and from an external electric power system 15 outside the vehicle 1 via a connecting part 14 such as a plug. As the external electric power system 15, for example, a charging facility including a charger for charging the battery 13, a connector for charging that connects the charger and the connecting part 14, and a feeding facility including a feeding section using electric power of the battery 13 and a feeding connector that connects the feeding section and the connecting part 14 are available.

Further, the vehicle 1 has an electronic control unit (ECU) 11 for controlling the engine 2, the motor 3, the transmission 4, the differential mechanism 5, the inverter 12 and the battery 13.

The electronic control unit 11 of the present embodiment controls charging/discharging of the battery 13 and gear shifting of the transmission 4 as well as the engine 2 and the motor 3. The electronic control unit 11 of this embodiment outputs a fueling command to the engine 2 and an outputting command to the motor 3 according to an operation of an accelerator pedal, which is not shown in the figure, operated by a user who is driving the vehicle 1. Further, the electronic control unit 11 outputs a fueling command to the engine 2 and an outputting command to the motor 3 as needed even without any operation of the accelerator pedal.

The engine 2 is an internal combustion engine that mixes fuel with air to burn upon a fuel injection command, thereby generating a driving force for driving the vehicle 1. At the time of cooperative running with the engine 2 and the motor 3 and single miming only using the motor 3, the motor 3 functions as a motor generating driving force for driving the vehicle 1 by using electric energy of the battery 13. At the time of deceleration of the vehicle 1, the motor 3 functions as a generator generating electric power by means of regeneration of the motor 3. At the time of regeneration of the motor 3, the battery 13 is charged with electric power (namely, regeneration energy) generated by the motor 3 so as to transmit and receive electric power to and from the motor 3.

Also, various control signals of multiple control parameters are to be input into the electronic control unit 11. The control signals include a shift position from a shift position sensor 31 for detecting a gear stage (shift stage), a vehicle speed from a vehicle speed sensor 32 for measuring a vehicle speed, a power storage amount (residual amount) from a power storage amount sensor 33 for measuring a power storage amount (SOC: State of Charge) of the battery 13, and others. The electronic control unit 11 controls on the basis of information from these sensors.

The shift position sensor 31 detects a shift position by receiving a command from the shift lever 60 operated by the user. The shift positions (shift ranges) of the shift lever 60 of this embodiment include a parking range P for parking the vehicle 1, a reverse travel range R for moving the vehicle 1 backward, a neutral range N for setting the shift lever 60 to the neutral state, and a driving range D and an S-driving range S for driving the vehicle 1. In this manner, the user can operate the shift lever 60 so as to select any shift position of the parking range P and one except the parking range P such as the driving range D.

It should be noted that the shift lever 60 of this embodiment is a lever-type, but not limited thereto. For example, the shift lever 60 may be a button- or switch-type.

Further, the vehicle 1 has the information display device for the vehicle 50 that conveys a status of the vehicle 1 to the user by displaying the status of the vehicle 1. The information display device for the vehicle 50 is composed of a display section 52 that displays information to be conveyed to the user and a display control section 51 that acquires information of the vehicle 1 from the electronic control unit 11 and selects an image and information to be conveyed to the user. Because of this configuration, the display control section 51 selects an image and information to be displayed on the display section 52 according to a status of the vehicle 1 transmitted from the electronic control unit 11 to the display control section 51. Details of displayed images and information will be described below. It should be noted that in this embodiment, "images" include not only static but also moving images.

Figure 2:
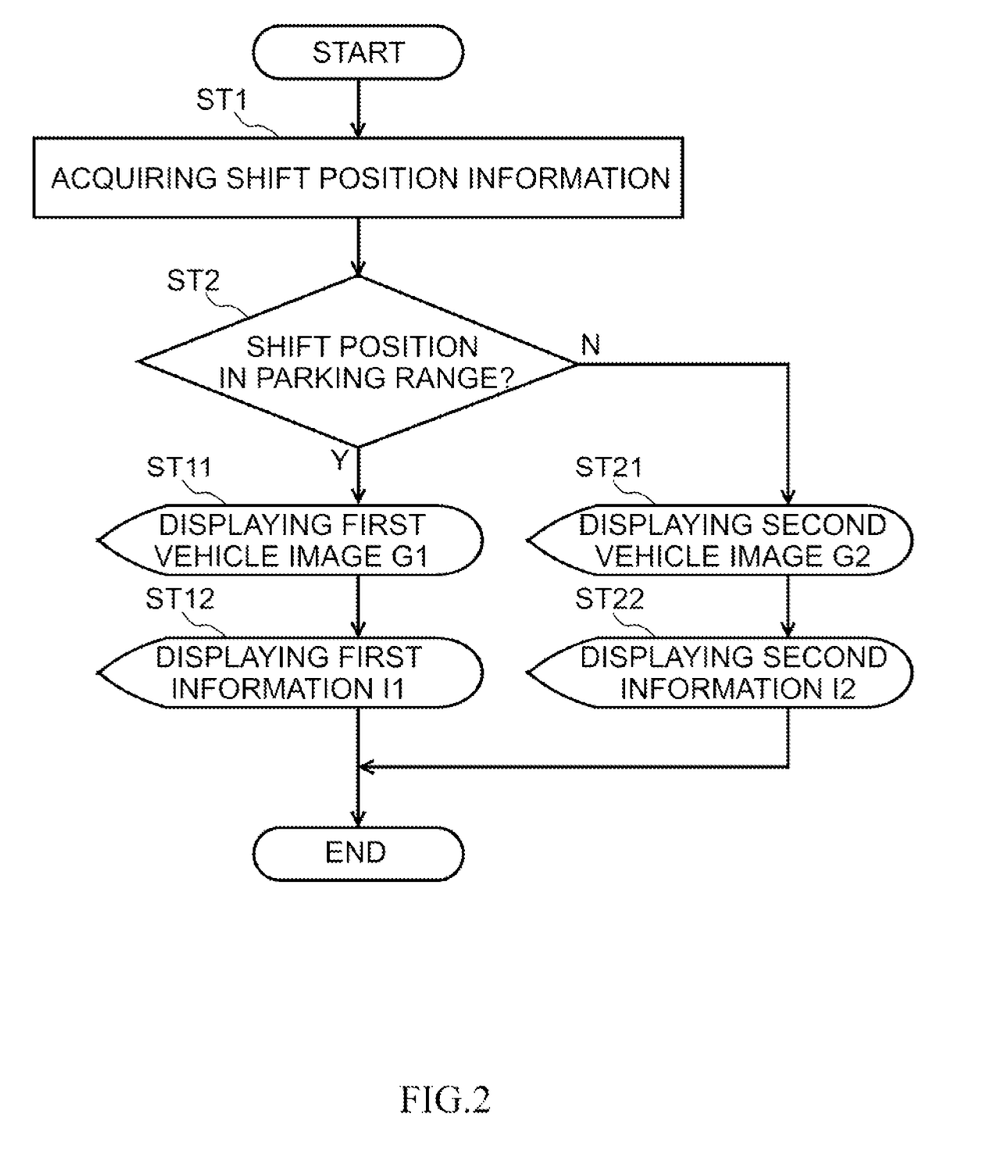
FIG. 2 is a flow chart illustrating a control procedure of an information display device for a vehicle of this embodiment.

A procedure of display control by using the information display device for the vehicle 50 will be described with reference to FIG. 2. FIG. 2 is a flow chart illustrating the control procedure of the information display device for the vehicle 50 of the present embodiment. As shown in FIG. 2, when selecting display contents to be displayed on the display section 52, the display control section 51 of the information display device for the vehicle 50 acquires information of a shift position of the shift lever 60 from the electronic control unit 11 (step ST1). Then, it is judged whether the shift position is in the parking range P (step ST2).

If the shift position is in the parking mange P in step ST2, the display section 52 displays a first vehicle image G1 showing that the vehicle 1 is in the parking state (step ST11), and also displays around the first vehicle image G1, information (first information I1) related to transmission and reception of electric power between the battery 13 and the electric power system 15 in the case that the vehicle 1 is in the parking state (step ST12). Details of the first vehicle image G1 and the first information I1 will be described below.

On the other hand, in step ST2, the display section 52 displays a second vehicle image G2 instead of the first vehicle image G1 showing that the vehicle 1 is in the travelable state when the shift position is in a range other than the parking range P, for example, the driving range D (step ST21), and also displays around the second vehicle image G2, information (second information I2) related to transmission and reception of electric power between the battery 13 and the motor 3 in the case that the vehicle 1 is in the travelable state (step ST22). Details of the second vehicle image G2 and the second information I2 will be described below.

Figure 3A:
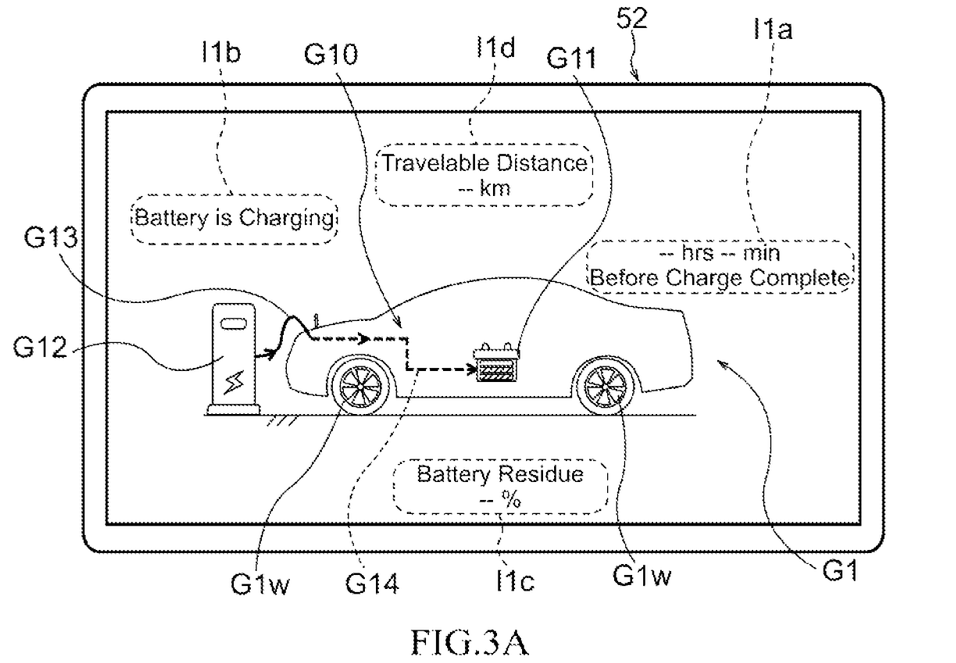
FIG. 3A is a view of images displayed on a display section when a shift position is in the parking range, showing a charging state of a battery.
Figure 3B:
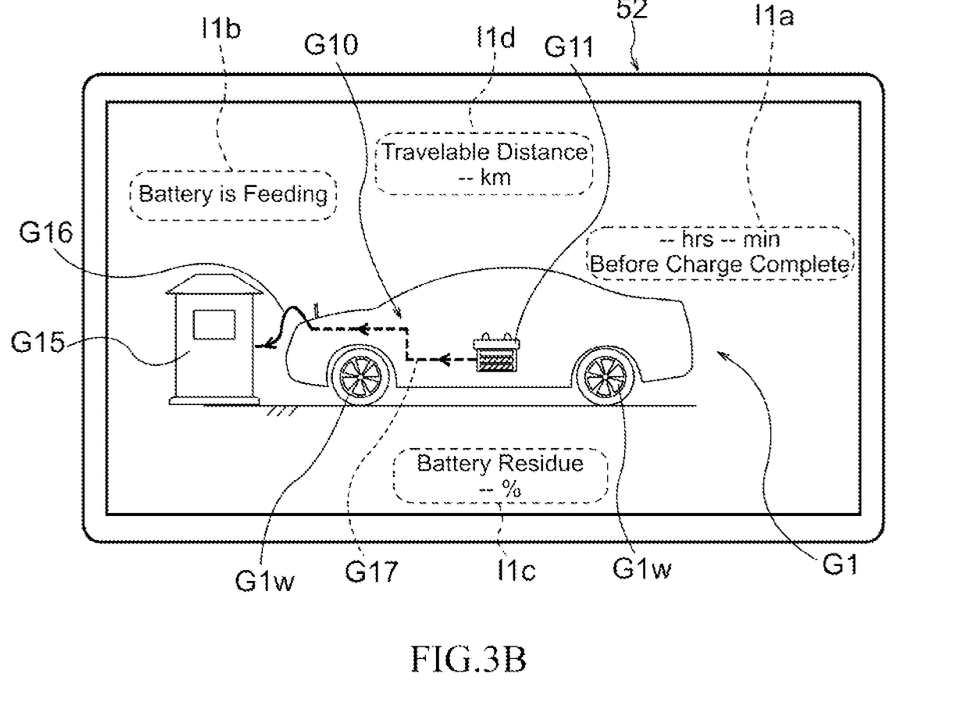
FIG. 3B is a view of images displayed on a display section when a shift position is in the parking range, showing a feeding state of a battery.

Details of the first vehicle image G1 and the first information I1 displayed on the display section 52 by the display control section 51 in the case that the vehicle 1 is in the parking state will be described with reference to FIG. 3A and FIG. 3B. FIG. 3A and FIG. 3B are views of images displayed on the display section 52 when the shift position is in the parking range P, of which FIG. 3A shows that the battery 13 is charging, and FIG. 3B shows that the battery 13 is feeding.

As shown in FIGS. 3A and 3B, in the parking state of the vehicle 1, the first vehicle image G1 is displayed at the center of the display section 52. The first vehicle image G1 is an image imitating a vehicle viewed from the side. Here, the horizontal direction of the display section 52 corresponds to the front-back direction of the vehicle. The first vehicle image G1 of this embodiment is outlined only with a line, but not limited thereto.

Further, when the first vehicle image G1 is displayed on the display section 52, an image G10 is displayed inside the first vehicle image G1, showing an electric power transmission state in charging of or feeding from the battery 13. Specifically, as shown in FIG. 3A, the image showing the electric power transmission state G10 has an image imitating a battery G11. And, in the charging state of the battery 13, the image G10 has additionally air image imitating a charging facility G12, an image imitating a charging connector G13 and an image of arrows indicating an electric power transmission direction G14. Further, as shown in FIG. 3B, in the state of feeding from the battery 13, the image G10 showing the electric power transmission state has an image imitating a feeding section G15, an image imitating a feeding connector G16 and an image of arrows indicating an electric power transmission direction G17.

Here, the image of the charging facility G12 and the image of the feeding section G15 are arranged forward in the travelling direction of the first vehicle image G1 on the display section 52. An object disturbing traveling of the vehicle such as the feeding section in front of the vehicle can show the user visually that the vehicle 1 is in the parking state. Moreover, an image imitating a non-rotating wheel G1w (irrespective of a driving wheel or a driven wheel) being in contact with the ground may be displayed under the first vehicle image G1. Thus, the image of the non-rotating wheel G1w can visually show the user that the vehicle 1 is in the parking state.

If the first vehicle image G1 is displayed so that the front-bark direction thereof corresponds to the horizontal direction of the display section 52, the actual travelling direction of the vehicle 1 is different from the front-back direction of the first vehicle image G1. Thus, the user can intuitively gasp that the vehicle 1 is in the parking state by viewing the first vehicle image G1.

In addition, as the first vehicle image G1 is an image of the vehicle 1 viewed from the side, an image G1w of only two wheels of the four-wheeled vehicle 1 can represent the non-rotating state of the wheels. Thus, the user can be informed of the non-rotating state of the wheels with fewer images. Then, the display section 52 can have space for displaying more and different information in the parking state of the vehicle 1.

Further, the first vehicle image G1 is an image of the vehicle viewed from the side, which suggests that the image is larger in the horizontal direction. In this connection, because the human visual field is wide, the user can easily recognize necessary information in the parking state. Further, the first vehicle image G1 of the vehicle 1 viewed from the side can represent what no vehicle image of a vehicle viewed from the front-back direction can easily represent.

Moreover, when the first vehicle image G1 is displayed on the display section 52, the first information I1 related to transmission and reception of electric power between the battery 13 and the electric power system 15 is displayed around the first vehicle image G1. The first information I1 includes at least information I1a of time required for completing charging in the case that the battery 13 is charging from the electric power system 15 and information I1b indicating the state that the battery 13 is charging from the electric power system 15 or the state that the battery 13 is feeding the electric power system 15. In addition, the display section 52 may display numerical information I1e of a current battery residual amount and information I1d indicating a travelable distance of the motor 3 using this residual amount, as needed. It should be noted that it is not necessary to always display all of the information included in the first information I1. In other words, part of the information included in the first information I1 may be displayed selectively, for example, in the manner that neither the information I1a of time required for completing charging nor the information I1d indicating the travelable distance is displayed while the battery 13 is feeding.

In this embodiment, the first information I1 is displayed around the first vehicle image G1, but not limited thereto. The first information I1 may be displayed inside the first vehicle image G1.

Figure 4:
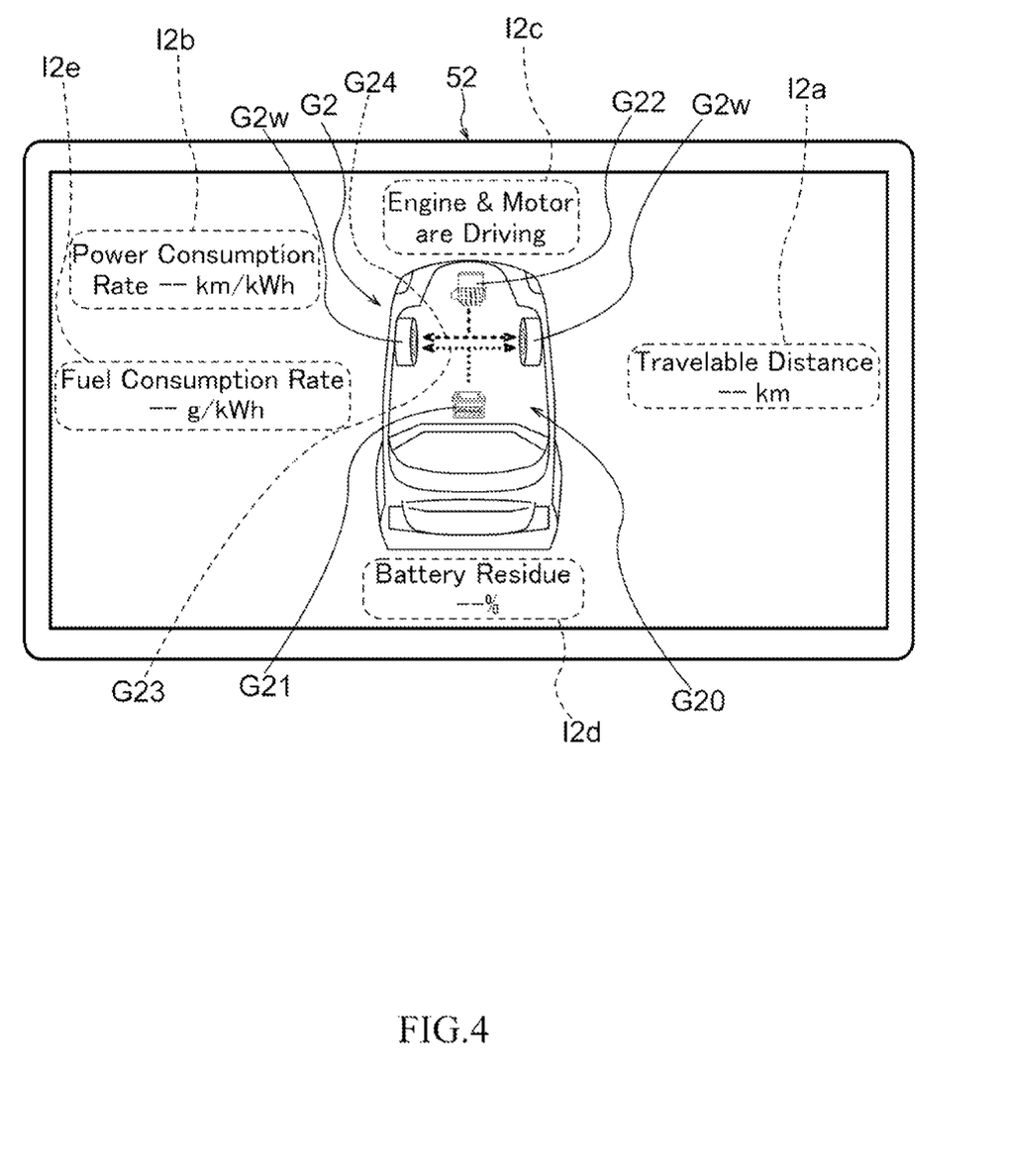
FIG. 4 is a view of images displayed on a display section when a shift position is in a range other than the parking range.

The second vehicle image G2 and the second information I2 displayed by the control section 51 on the display section 52 when the vehicle 1 is travelable (including when the vehicle 1 is running in the driving range D) will be described below with reference to FIG. 4. FIG. 4 is a view of images displayed on the display section 52 when the shift position is in a range other than the parking range P (for example, the driving range D).

As shown in FIG. 4, the second vehicle image G2 is displayed at the center of the display section 52 in the travelable state of the vehicle 1. The second vehicle image G2 is an image imitating a vehicle viewed from the above and the front-back direction (from the back side in this embodiment). In addition, the second vehicle image G2 is displayed so that the vertical direction of the display section 52 corresponds to the front-back direction of the vehicle.

Moreover, when the second vehicle image G2 is displayed on the display section 52, the second information I2 related to transmission and reception of electric power between the battery 13 and the motor 3 is displayed around the second vehicle image G2. The second information I2 includes at least one of information I2a of a travelable distance using the motor 3, information I2b of an electric power consumption rate of the motor 3, and information I2e showing the state that the motor 3 is regenerating or the state that the motor 3 is driving. In addition, numerical information I2d of a current battery residual amount may be displayed as needed.

It should be noted that, in this embodiment, the second information I2 is displayed around the second vehicle image G2, but not limited thereto, and thus may be displayed inside the second vehicle image G2.

As the information I2c of the regenerating state or the driving state of the motor whether the engine 2 is driving may be displayed simultaneously in addition to whether the motor 3 is driving. Moreover, if the information I2c indicating the regenerating state or the driving state of the motor 3 is displayed so as to correspond to an image, which will be described below, indicating the driving power transmission state or the electric power transmission state G20, the user can be informed more clearly of the status related to drive of the vehicle 1. It should be noted that it is not necessary to always display all of the information included in the second information I2, but part of the information I2 may be displayed selectively.

Further, the information I2a of the travelable distance and the information I2b of the electric power consumption rate of the second information I2 is directly related to traveling. Therefore, if the information I2a and the information I2b is displayed next to the second vehicle image G2 in the horizontal direction, the user can easily recognize this information.

Furthermore, the information displayed around or inside the second vehicle image G2 may include not only the second information I2 related to the motor 3, but also any information related to the engine 2. Specifically, information I2e of fuel consumption rate of the engine 2 may be displayed around or inside the second vehicle image G2.

Figure 5A:
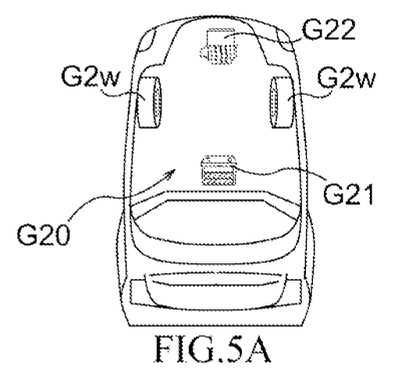
FIG. 5A is a view of an image showing a driving power transmission state or an electric power transmission state displayed inside a second vehicle image in the case that neither an engine nor a motor is driven.
Figure 5B:
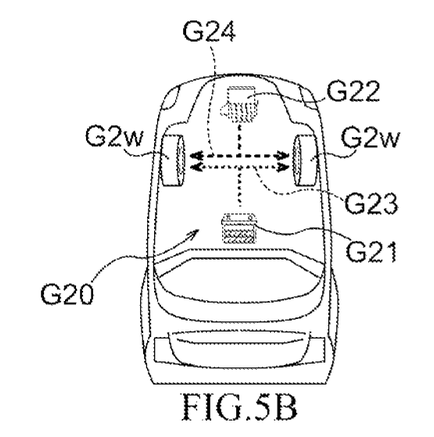
FIG. 5B is a view of an image showing a driving power transmission state or an electric power transmission state displayed inside a second vehicle image in the case that driving wheels are driven by power of an engine and a motor.
Figure 5C:
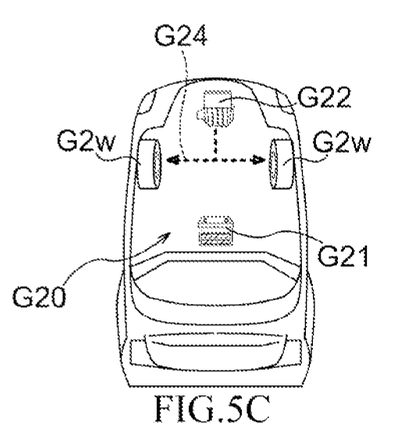
FIG. 5C is a view of an image showing a driving power transmission state or an electric power transmission state displayed inside a second vehicle image in the case that driving wheels are driven by power of an engine.
Figure 5D:
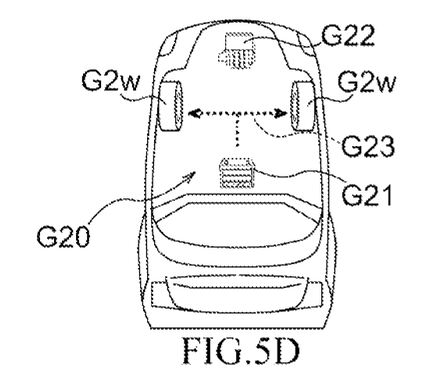
FIG. 5D is a view of an image showing a driving power transmission state or an electric power transmission state displayed inside a second vehicle image in the case that driving wheels are driven by power of a motor.
Figure 5E:
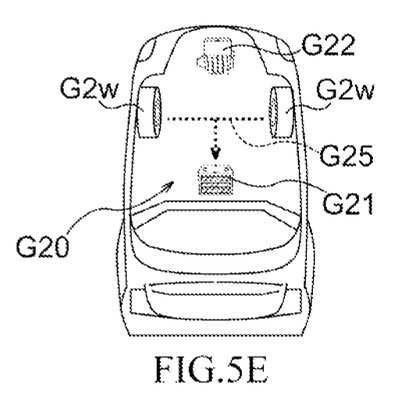
FIG. 5E is a view of an image showing a driving power transmission state or an electric power transmission state displayed inside the second vehicle image in the case of regeneration from driving wheels.

FIGS. 5A to 5E are examples of the image indicating the driving power transmission state or the electric power transmission state G20 displayed inside the second vehicle image G2. FIG. 5A shows the case that neither the engine 2 nor the motor 3 is driven. FIG. 5B shows the case that the driving wheels WR, WL are driven by power of the engine 2 and the motor 3. FIG. 5C shows the case that driving wheels WR, WL are driven by power of the engine 2. FIG. 5D shows the case that driving wheels are driven by power of the motor 3. FIG. 5E shows the case that the motor 3 is regenerating from the driving wheels WR.

As shown in FIGS. 4, 5A to 5E, when the second vehicle image G2 is displayed on the display section 52, the image G20 indicating the driving power transmission state or the electric power transmission state from the engine 2 and the motor 3 to the driving wheels WR, WL is displayed around or inside the second vehicle image G2. Specifically, the image G20 indicating the driving power transmission state or the electric power transmission state includes an image G2w of a wheel viewed from the oblique above and an image G21 imitating a battery an image G22 imitating an engine, an image G23 of arrows indicating a transmission direction of driving power generated by the motor 3 (or a transmission state of electric power generated by the battery), an image G24 of arrows indicating a transmission direction of driving power generated by the engine 2, and an image of arrows G25 indicating a transmission direction of driving power of the driving wheels WR, WL transmitted to the motor 3 (see FIG. 5E). Here, there is the image G21 imitating a battery below the images of arrows G23, G25. And, while no image of a motor is shown in FIGS. 5A to 5E, an image imitating a motor may be displayed between the image G21 and the image G23 or the image G25.

When the second vehicle image G2 is displayed so that the front-back direction thereof corresponds to the vertical direction of the display section 52, the actual travelling direction of the vehicle 1 and the front-back direction of the second vehicle image G2 correspond to each other. Thus, the user can intuitively grasp that the vehicle 1 is travelling or ready to start travelling by viewing the second vehicle image G2.

In addition, as the second vehicle image G2 indicates the vehicle 1 viewed from the above, both the driving wheels WR, WL can be displayed. This can inform the user of the driving power transmission state from the engine 2 and the motor 3 and the electric power transmission state from the battery in detail.

It should be noted that in this embodiment, in the second vehicle image G2, only the image of the front wheels, serving as the driving wheels are displayed as the image G2w of the wheels, but not limited thereto. In the case of the four-wheel drive or the all-wheel drive, an image showing the rear wheels is displayed in addition to the front wheels. Further, display ability of both the image of the driving wheels can accurately inform the user of a power flow and an energy flow even in the case of controlling driving force of each driving wheel individually.

Figure 6A:
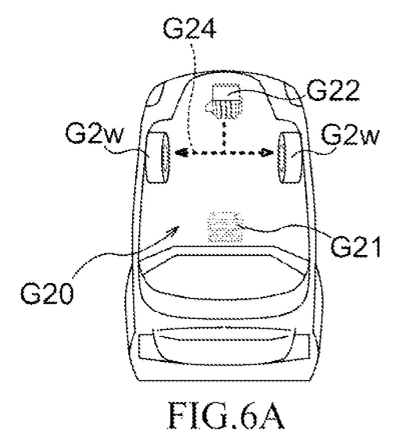
FIG. 6A is a view of a variant of an image showing a driving power transmission state or an electric power transmission state from an engine and a motor to driving wheels.
Figure 6B:
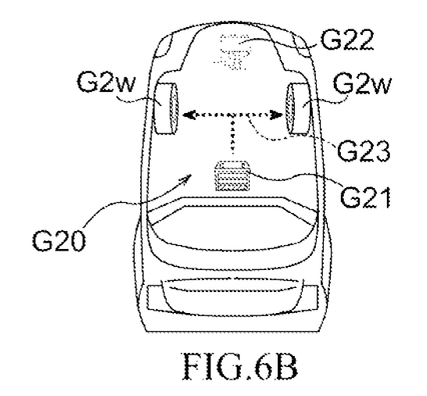
FIG. 6B is a view of a variant of an image showing a driving power transmission state or an electric power transmission state from an engine and a motor to driving wheels.
Figure 6C:
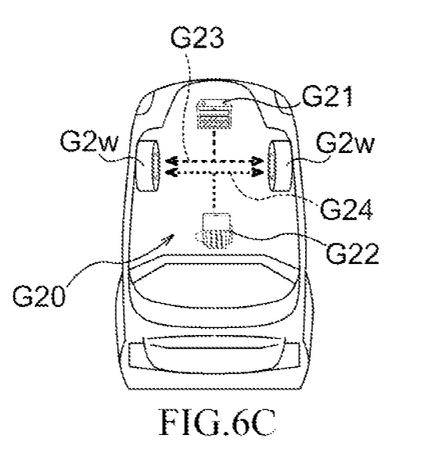
FIG. 6C is a view of a variant of an image showing a driving power transmission state or an electric power transmission state from an engine and a motor to driving wheels.

It should be noted that the image G20 indicating the driving power transmission state or the electric power transmission state from the engine 2 and the motor 3 to the driving wheels WR, WL is not limited to that described above. FIG. 6A to 6C are views showing variations of the image G20 indicating, the driving power transmission state or the electric power transmission state from the engine 2 and the motor 3 to the driving wheels WR, WL.

In the above-described configuration, in the image G20 indicating the driving power transmission state or the electric power transmission state from the engine 2 and the motor 3 to the driving wheels WR, WL, the image G21 imitating a battery and the image G22 imitating an engine are always displayed, but not limited thereto.

For example, as shown in FIG. 6A, the engine 2 is used as a driving source for the driving wheels WR, WL, whereby the visibility of the image G21 imitating a battery may be lowered in the case of non-use of the motor 3. Specifically, the image G21 imitating a battery may be hidden, or the brightness thereof may be lowered. Moreover, as shown in FIG. 6B, the motor 3 is used as the driving source for the driving wheels WR, WL, whereby the visibility of the image G22 imitating an engine may be lowered in the case of non-use of the engine 2. Specifically, the image G22 imitating an engine may be hidden, or the brightness thereof may be lowered.

Further, in the above-described configuration, in the image G20 showing the driving power transmission state or the electric power transmission state from the engine 2 and the motor 3 to the driving wheels WR, WL, the image G21 imitating a battery is arranged on the rear side of the vehicle, and the image G22 imitating an engine is arranged on the front side of the vehicle side, but not limited thereto. For example, as shown in FIG. 6C, the image G21 imitating a battery may be arranged on the front side of the vehicle, and the image G22 imitating an engine may be arranged on the rear side of the vehicle.

As described above, in the information display device 50 for the vehicle of this embodiment, the image displayed on the display section 52 includes either the first vehicle image G1 or the second vehicle image G2 indicating the vehicle viewed from the mutually different directions. And, the first vehicle image G1 is displayed on the display section 52 when the shift lever 60 selects the packing range P, and the second vehicle image G2 is displayed on the display section 52 when the shift lever 60 selects at least the driving range D. In this manner, on the display section 52, the first vehicle image G1 and the second vehicle image G2 are displayed as the vehicle viewed from the directions respectively different according to whether the shift lever 60 selects the driving range D or the parking range P. Then, the user can immediately recognize whether the vehicle is in the parking state according to how the vehicle image looks on the display section 52, which enables the user to accurately recognize the vehicle state.

Moreover, in this embodiment, the vehicle image of the vehicle viewed from the side is displayed as the first vehicle image G1 when the shift lever 60 selects the parking range P, and the vehicle image of the vehicle viewed from the above is displayed as the second vehicle image G2 when the shift lever 60 selects the driving range D. Then, the first and second vehicle images G1, G2 are significantly different from each other, whereby the user can immediately recognize whether the vehicle 1 is in the parking state according to how the vehicle image looks on the display section 52. Furthermore, in the first vehicle image G1 of the vehicle viewed from the side, a still object can be displayed in the travelling direction of the vehicle, and an image of a rotatable wheel put in standstill can be displayed, which expands the range of expression of the vehicle state. On the other hand, the second vehicle image G2 of a vehicle viewed from the above can effectively represent the travelling vehicle.

Moreover, in this embodiment, the first vehicle image G1 is displayed so that the horizontal direction of the display section 52 corresponds to the front-back direction, of the vehicle, and the second vehicle image G2 is displayed so that the vertical direction of the display section 52 corresponds to the front-back direction of the vehicle. Thus, the first and second vehicle images G1, G2 look significantly different from each other, which enables the user to immediately identify whether the vehicle is in the parking state according to how the vehicle image looks on the display section 52. Further, if the first vehicle image G1 is displayed so that the front-back direction thereof corresponds to the horizontal direction on the display section 52, the real travelling direction of the vehicle 1 is different from the front-back direction of the first vehicle image G1. Thus, the user can intuitively grasp that the vehicle 1 is in the parking state by viewing the first vehicle image G1. On the other hand, if the second vehicle image G2 is displayed so that the front-back direction thereof corresponds to the vertical direction on the display section 52, the real travelling direction of the vehicle 1 corresponds to the front-back direction on the display section 52. Thus, the user can intuitively grasp that the vehicle 1 is travelling or ready to start travelling by viewing the second vehicle image G2.

Moreover, in this embodiment, when the shift lever 60 selects the parking range P, the displaying of the information I1 related to transmission and reception of electric power between the battery 13 and the external electric power system 15 around or inside the first vehicle image G1 can convey information peculiar to the parking state of the vehicle 1 such as charging of and feeding from the battery 13 to the user. On the other hand, when the shift lever 60 selects the driving range D, the displaying of the second information I2 related to transmission and reception of electric power between the battery 13 and the motor 3 around or inside the second vehicle image G2 can convey information peculiar to the traveling time (including travelable time) of the vehicle 1 such as drive and non-drive of the motor 3 using the battery 13 to the user. Thus, the user can accurately recognize the status of the vehicle 1 by being shown information, including whether the vehicle 1 is in the parking, state, according to the status of the vehicle 1.

Further, in this embodiment, the first information I1 includes at least one of the information I1a of time required for completing charging in the case that the battery 13 is charging from the electric power system 15, the information I1b indicating the state that the battery 13 is, charging from the electric power system 15 or the state that the battery 13 is feeding the electric power system 15, the information I1e indicating a residual amount of the battery 13, and the information I1d indicating a travelable distance of the vehicle 1 based on the residual amount of the capacitor 13. Thus, the user can obtain information from the first information I1 to recognize the status of the vehicle 1 in the parking state in more detail.

In addition, the second information I2 includes at least one of the information I2a of a travelable distance using the motor 3, the information I2b of an electric power consumption rate of the motor 3 and the information I2c indicating the state that the motor 3 is regenerating or the state that the motor 3 is driving. Thus, the user can obtain information from the second information I2 to recognize the status of the vehicle 1 in the travelable state in more detail.

Further, in this embodiment, the image G10 is displayed inside the first vehicle image G1, indicating the state of electric power transmission in charging of or feeding from the battery 13. As the capacitor charges or feeds in the parking state of the vehicle 1, the user can visually see that the vehicle is in the parking state. And, upon recognition that the vehicle 1 is in the parking state, the user can easily recognize the status of the vehicle 1 in the parking state.

Also, in this embodiment, the image G20 indicating the driving power transmission state or the electric power transmission state from the engine 2 and the motor 3 to the driving wheels WR, WL is displayed around or inside the second vehicle image G2. As the driving power transmission or the electric power transmission from the engine 2 and motor 3 to the driving wheels WR, WL is performed in the travelable state of the vehicle, the user can visually see that the vehicle is in the travelable state. And, upon the recognition that the vehicle 1 is in the travelable state, the user can easily recognize the status of the vehicle 1 in the travelable state.

Moreover, in this embodiment, when displaying the second vehicle image G2 on the display section 52, the information I2e related to the fuel consumption rate of the engine is displayed around or inside the second vehicle image G2. Thus, the user can recognize the status of the vehicle 1 in the travelable state in detail.

While one embodiment of the present invention has been described above, the invention is not limited to the abovementioned embodiment, but various modifications are possible within the scope of the technical idea as defined in the claims, the specification, and the drawings.

In the above-described embodiment, the first vehicle image G1 is displayed so that the traveling direction of the vehicle is left, but not limited thereto. Namely, the first vehicle image G1 may be displayed so that the traveling direction of the vehicle is right. Further, the second vehicle image G2 is displayed so that the traveling direction of the vehicle is up, but not limited thereto. Namely, the second vehicle image G2 may be displayed so that the traveling direction of the vehicle is down. In addition, the second vehicle image G2 is displayed as the vehicle image of the vehicle viewed from the upper rear side, but not limited thereto. Namely, the vehicle image of the vehicle viewed from the upper front side.

What is claimed is:

1. An information display device equipped in a vehicle having a shift lever that selects a shift range from shift ranges including a parking range and at least one shift range other than the parking range; driving wheels; an electric motor serving as a power source of the driving wheels and regenerating from the driving wheels; and a battery transmitting and receiving electric power to and from the electric motor, the information display device comprising:
    a display section having a display screen including a vertical direction; and
    a display control section selecting an image and information to be displayed to a user on the display section according to a status of the vehicle, acquiring vehicle information of the vehicle, and controlling the display section so that at least one image corresponding to the vehicle information is displayed on the display screen,
    wherein the vehicle information includes a shift range selected by the shift lever,
    wherein a first vehicle image is displayed on the display screen when the parking range is selected by the shift lever,
    wherein a second vehicle image is displayed on the display screen instead of the first vehicle image when a shift range other than the parking range is selected by the shift lever,
    wherein a front and rear direction of a vehicle represented by the first vehicle image is oriented to a horizontal direction perpendicular to the vertical direction of the display screen,
    wherein a front and rear direction of a vehicle represented by the second vehicle image is oriented to the vertical direction of the display screen,
    wherein the battery can transmit and receive electric power to and from an electric power system outside the vehicle equipped with the information display device, and
    wherein an image indicating the electric power system is further displayed around the first vehicle image on the display screen only when the parking range is selected by the shift lever.

2. The information display device in the vehicle according to claim 1,
    wherein the first vehicle image is a lateral side view image of the vehicle represented by the first vehicle image and the second vehicle image, and
    wherein the second vehicle image is an above view image of the vehicle represented by the first vehicle image and the second vehicle image.

3. The information display device in the vehicle according to claim 1,
    wherein the vehicle information includes first information related to transmission and reception of the electric power between the battery and the electric power system; and second information related to transmission and reception of the electric power between the battery and the electric motor,
    wherein the first information around or inside the first vehicle image is further displayed on the display screen when the parking range is selected by the shift lever, and
    wherein the second information around or inside the second vehicle image is further displayed on the display screen when the shift range other than the parking range is selected by the shift lever.

4. The information display device in the vehicle according to claim 3,
    wherein the first information includes at least one of information of time required for complete charging when the battery is charging from the electric power system, information indicating either a state that the battery is charging from the electric power system or a state that the battery is feeding the electric power system, information indicating a remaining battery level of the battery, and information indicating a travelable distance of the vehicle equipped with the information display device based on the remaining battery level of the battery.

5. The information display device in the vehicle according to claim 4,
    wherein the second information includes at least one of information of the travelable distance using the electric motor, information of a power consumption rate of the electric motor, and information indicating either a state that the electric motor is regenerating or a state that the electric motor is driving.

6. The information display device in the vehicle according to claim 1,
    wherein an image indicating an electric power transmission state in charging of or feeding from the battery is further displayed inside the first vehicle image on the screen when the parking range is selected by the shift lever.

7. The information display device in the vehicle according to claim 1,
    wherein the vehicle equipped with the information display device has an internal combustion engine serving as a power source of the driving wheels, and
    wherein an image indicating a driving power transmission state or an electric power transmission state from the internal combustion engine or the electric motor to the driving wheels is further displayed inside the second vehicle image on the display screen when the shift range other than the parking range is selected by the shift lever.

8. The information display device in the vehicle according to claim 7,
    wherein an image indicating any information related to a fuel consumption rate of the internal combustion engine is further displayed around or inside the second vehicle image on the display screen.

\* \* \* \* \*